Sept. 6, 1932.   C. H. TAYLOR   1,876,093
BRAKE
Filed March 28, 1929

INVENTOR
CECIL H. TAYLOR
BY
*Jn. W. McConkey*
ATTORNEY

Patented Sept. 6, 1932

1,876,093

UNITED STATES PATENT OFFICE

CECIL H. TAYLOR, OF DETROIT, MICHIGAN, ASSIGNOR TO BENDIX BRAKE COMPANY, OF SOUTH BEND, INDIANA, A CORPORATION OF ILLINOIS

BRAKE

Application filed March 28, 1929. Serial No. 350,528.

This invention relates to brakes, and is illustrated as embodied in an internal expanding brake for an automobile. An object of the invention is to provide a simple but powerful brake, preferably having a servo action in both directions of drum rotation, and which can be manufactured economically. Various features of novelty relate to the shoe arrangement, to a novel cam lever mounting, to a torsion return spring, and to other desirable constructions which will be apparent from the following description of the illustrative embodiments shown in the accompanying drawing, in which.

Figure 1:
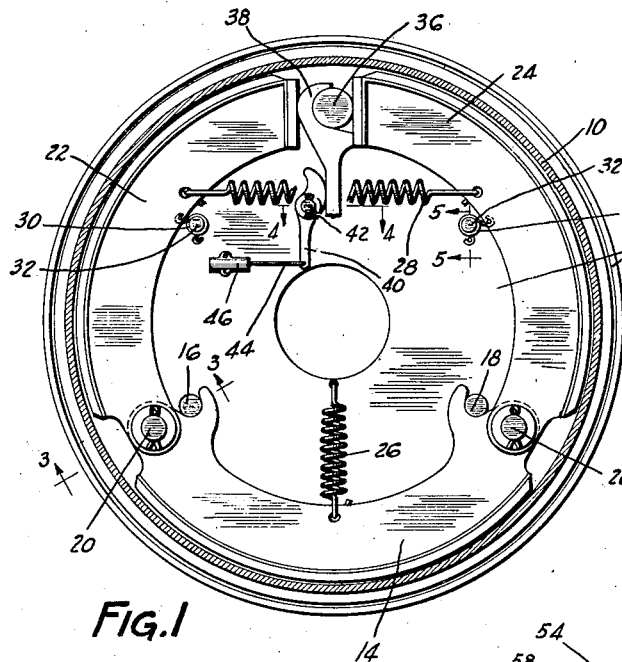
Figure 1 is a vertical section through the brake, just inside the head of the brake drum, showing the brake shoes in side elevation.
Figure 3:
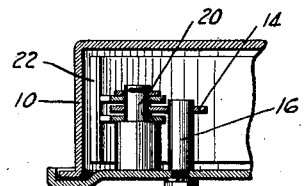
Figure 3 is a partial section on the line 3—3 of Figure 1, showing one of the brake anchors.
Figure 4:
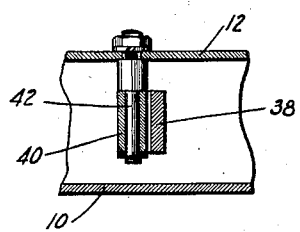
Figure 4 is a partial section through the applying means on the line 4—4 of Figure 1.
Figure 5:
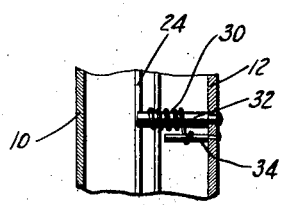
Figure 5 is a partial section on the line 5—5 of Figure 1, showing one of the torsion springs.

The brake includes a rotatable drum 10, at the open side of which is a support such as a backing plate 12, and within which is arranged the friction means of the brake. The friction means preferably includes a central rigid shoe 14, notched at its ends to engage two anchor posts 16 and 18, and connected at its ends by means such as floating pivots 20 to two end servo shoes 22 and 24. A lower return spring 26, tensioned between shoe 14 and the backing plate, urges shoe 14 against the anchors 16 and 18, while another return spring 28 is tensioned between the shoes 22 and 24.

The weight of the shoe assembly is preferably balanced, at least in part by novel torsion springs 30 sleeved on posts 32 carried by the backing plate. One end of each spring 30 is operatively connected to one of the shoes 22 or 24, and the other end is operatively connected to the backing plate by means such as a small post 34 carried thereby.

Between the upper or unconnected ends of shoes 22 and 24 is a fixed post 36, carried by the backing plate, and on which is pivotally supported an operating cam lever 38 operatively engaging both shoes, and recessed to fit over the post 36. The lower end of the floating lever 38 is in thrust engagement with an operating lever 40 mounted on a fixed fulcrum 42 carried by the backing plate. Lever 40 is operated by means such as a tension cable 44 passing through the backing plate through a fitting 46.

In operation, if the drum is turning clockwise when the brake is applied the shoe 14 anchors on the post 16, while i* the drum is turning counter-clockwise the shoe 14 anchors on the post 18. Shoes 22 and 28 have parallel spaced stiffening webs, the lower end of which straddle the opposite ends of the single web of shoe 14, to facilitate the arrangement of the pivots 20. Pivots 20 may be formed with enlarged heads slidably engaging the backing plate.

Figure 2:
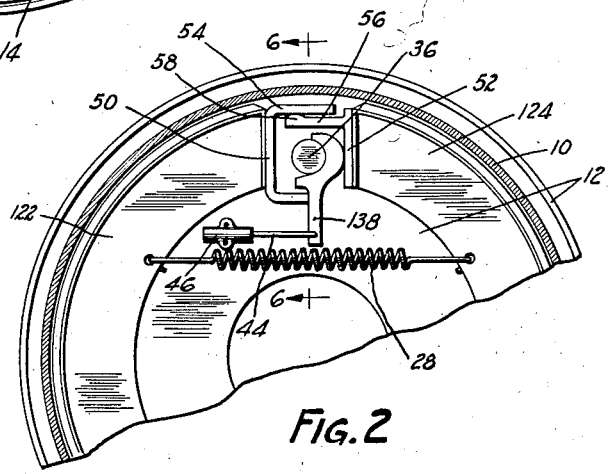
Figure 2 is a similar view of the upper portion of a modified form.
Figure 6:
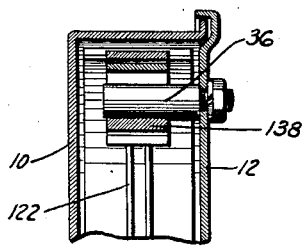
Figure 6 is a section, on the line 6—6 of Figure 2, through the applying means of this modification.

In Figures 2 and 6, the shoes 122 and 124 are steadied by being provided with end fittings or cam plates 50 and 52, having overlapping projections 54 and 56, one preferably having a rounded lug 58 on its side to diminish friction.

While certain illustrative constructions have been described in detail, it is not my intention to limit the scope of the invention to those particular embodiments, or otherwise than by the terms of the appended claims.

I claim:

1. A brake comprising, in combination, a drum, a rigid shoe engageable with the drum and anchoring at one end when the drum is turning in one direction and at the other end when the drum is turning in the other direction, a rigid servo shoe operatively connected to each end of the first shoe, a stop between the unconnected ends of the servo shoes, and a floating cam lever pivotally supported by the stop and engaging both servo shoes.

2. A brake comprising, in combination, a drum, spaced anchors a rigid shoe engageable with the drum and anchoring at one end on one anchor when the drum is turning in one direction and at the other end when the drum is turning in a reverse direction, a rigid servo shoe operatively connected to each end of the first shoe, a stop between the unconnected ends of the servo shoes, a floating cam lever pivotally supported by the stop and engaging both servo shoes, and means yieldingly urging the first shoe toward both anchors.

3. A brake comprising, in combination, an anchor, a floating shoe, and a torsion spring urging the shoe toward an idle position determined by the anchor.

4. A brake comprising, in combination, a floating shoe, and a torsion spring urging the shoe toward idle position.

5. A brake comprising, in combination, a backing plate, a shoe, a post carried by said plate adjacent the shoe, and a torsion spring sleeved on the post and operatively connected at one end to the backing plate and at its other end to said shoe.

6. A brake comprising, in combination, friction means having adjacent separable ends, a post between said ends, a floating cam lever pivotally supported by said post and operatively engaging said ends, and a lever pivoted on a fixed fulcrum adjacent the end of the first lever and arranged in operative thrust engagement with the first lever.

7. A brake comprising, in combination, friction means having adjacent separable ends, a post between said ends, a floating cam lever pivotally supported by said post and operatively engaging said ends, and a lever pivoted on a fixed fulcrum adjacent the end of the first lever and arranged in operative engagement with the first lever.

8. A brake comprising, in combination, friction means having adjacent separable ends, a post between said ends, a floating cam lever having a notch engaging said post and operatively engaging said ends, and a lever pivoted on a fixed fulcrum adjacent the end of the first lever and arranged in operative engagement with the first lever.

9. A brake comprising a backing plate, friction means having adjacent separable ends, a post between said ends mounted on the backing plate, a floating cam lever supported by said post and operatively engaging said ends, and a lever pivotally secured to the backing plate having one end operatively engaging the cam lever.

In testimony whereof, I have hereunto signed my name.

CECIL H. TAYLOR.